Figure 1:
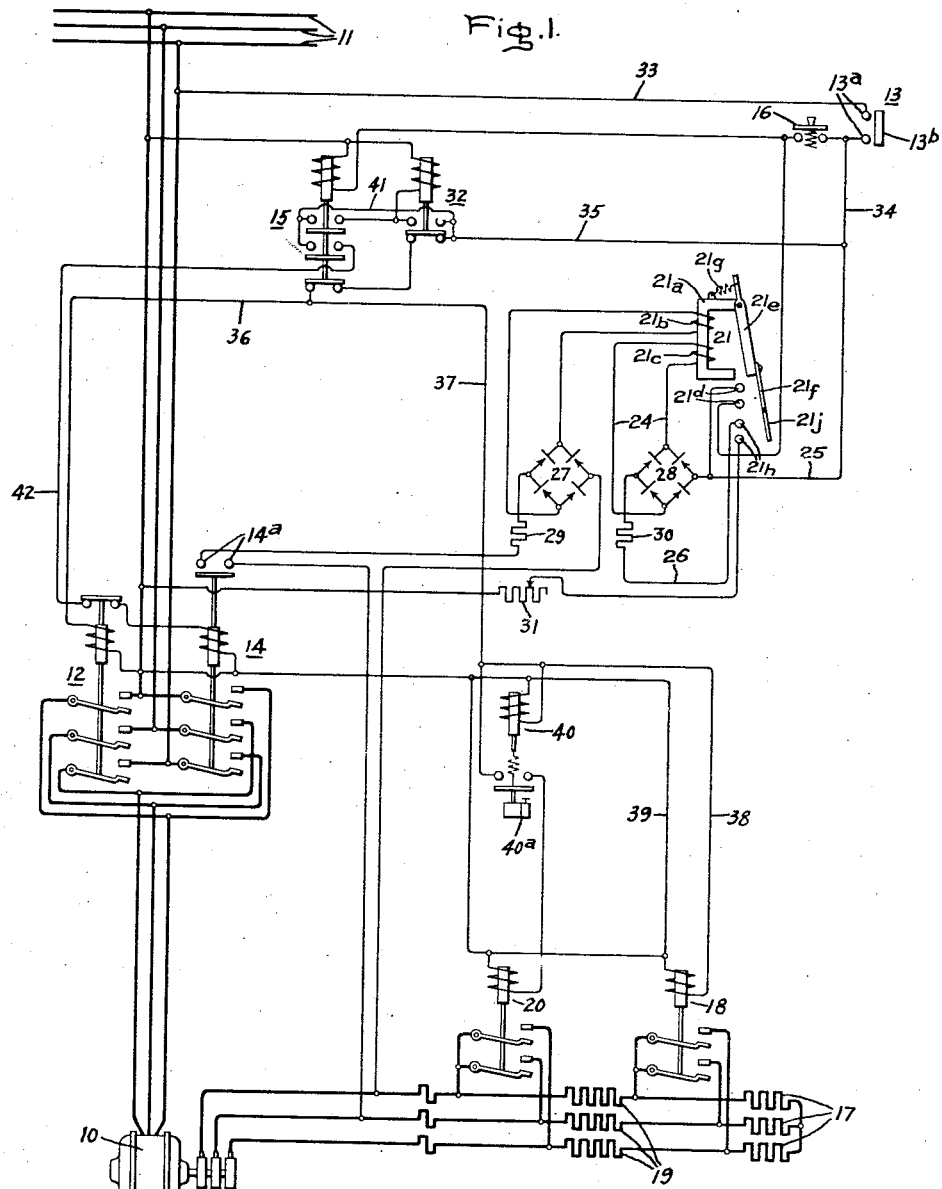

Sept. 27, 1938.　　　A. J. WADE　　　2,131,607

CONTROL SYSTEM

Filed Dec. 15, 1937

Inventor:
Allan J. Wade,
by Harry E. Dunham
His Attorney.

Patented Sept. 27, 1938

2,131,607

UNITED STATES PATENT OFFICE 2,131,607

CONTROL SYSTEM

Allan J. Wade, Schenectady, N. Y., assignor to General Electric Company, a corporation of New York Application December 15, 1937, Serial No. 179,887

11 Claims. (Cl. 172—179)

This invention relates to control systems, more particularly to systems for controlling the stopping of reversible alternating current motors, and it has for an object the provision of a simple, reliable and improved system of this character.

Heretofore, control systems for reversible alternating current motors have been proposed wherein provision was made for stopping the motor and its load by plugging the motor. A motor is plugged when its primary winding is connected to the power source for rotation in a direction opposite to that in which its rotor is actually rotating. This occurs, for example, when a motor is rotating and driving its load in the forward direction, and the connections between the motor and the source are suddenly reversed. When a motor is plugged, a large reverse torque is developed which quickly brakes the motor and its load to rest. After stopping the load, the motor will start to drive the load in the reverse direction unless disconnected from the source at the proper instant. In many industrial and other applications, such a reversal of the load is undesirable and may lead to damage to expensive machinery or other serious accidents.

For the purpose of overcoming this difficulty, various forms of control switches operated either frictionally or electromagnetically by the driving gears, have been arranged to disconnect the motor upon initial reverse movement of the load. Devices of this character require special drive shaft extensions which, in turn, require space which often is not available. Such devices are also subject to vibrations which adversely affect their operation and produce rapid deterioration. Furthermore, such devices are not suitable for vertical motors without a considerable amount of extra gearing and other complications.

Electroresponsive devices connected in the secondary circuit of an alternating current motor have also been utilized for this purpose, but the accuracy of these devices was adversely affected by variations in the line voltage and by the frequency effect of the variable frequency alternating voltage supplied by the secondary windings to the actuating coils of such devices. In this connection, the secondary voltage and frequency vary in direct proportion and as a result the current supplied to the actuating coil of an electroresponsive device remains substantially constant over a wide range of voltage and frequency, thereby rendering the electroresponsive device insensitive to variations in the speed of the motor.

Consequently, an important object of this invention is the provision of a novel arrangement of control apparatus and circuits whereby an alternating current motor may be plugged, i. e. reverse power braking connections established for the motor, and a simple and reliable electro- responsive device provided for interrupting the reverse power braking connections at substantially zero speed of the motor and in which provision is made for eliminating inaccuracies resulting from variations in line voltage and from frequency effects.

In carrying the invention into effect in one form thereof, means are provided for connecting the motor to a source of alternating voltage for rotation in the forward direction, and means are provided for disconnecting the motor from the source and reconnecting it therewith for rotation in the reverse direction, thereby establishing reverse power braking connections for the motor. In addition, means responsive to the voltage of the primary and secondary windings are provided for interrupting the reverse power braking connections at substantially zero speed of the motor. In order to eliminate the frequency effects from the voltages supplied to this voltage responsive means, suitable rectifying means are provided in the connections.

In illustrating the invention in one form thereof, it is shown as applied to a wound rotor induction motor suitable for driving a load which must be stopped quickly such, for example, as a large sugar centrifugal or the supercalender of a paper-finishing machine. It will be understood, however, that the invention has other applications and may be applied to other types of motors.

Figure 2:
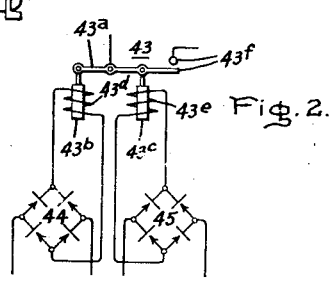

For a better and more complete understanding of the invention, reference should now be had to the following specification and to the accompanying drawing in which Fig. 1 is a simple, diagrammatical representation of an embodiment of the invention, and Fig. 2 is a simple, diagrammatical illustration of a modification of the system of Fig. 1.

Referring now to the drawing, a load, such for example as a sugar centrifugal (not shown) is driven by an alternating current motor 10, illustrated as a wound rotor induction motor. Motor 10 is supplied with power from a suitable source, represented by the three supply lines 11 to which the motor is connected for rotation in the forward direction by means of an electromagnetic contactor 12 under the control of a suitable master switch 13. The master switch 13 is illustrated as comprising a pair of stationary contacts 13a and a movable contact 13b for bridging the stationary contacts.

For the purpose of plugging the motor, i. e. establishing reverse power braking connections therefor, and electromagnetic contactor 14 is provided for connecting the primary winding of motor 10 to the source 11 for rotation in the reverse direction. For the plugging operation, both contactors 12 and 14 are under the control of a control relay 15 which, in turn, is under the control of a suitable "stop" push button type switch 16.

A plugging resistor 17 is included in the secondary circuit of the motor 10 for limiting the current inrush to the motor during the plugging operation. An electromagnetic contactor 18 is provided for short-circuiting this resistor when the motor is started from rest.

A resistor 19 known as an accelerating resistor is also including in the secondary circuit of the motor, and an electromagnetic contactor 20 is provided for short-circuiting the accelerating resistor 19 during the starting operation of the motor.

For the purpose of controlling the reverse contactor 14 to interrupt the reverse power braking connections at substantially zero speed of the motor, suitable electroresponsive means 21 are provided. These means are illustrated as a relay having a core member 21a upon which two actuating coils 21b and 21c are wound. The relay is shown as provided with a pair of stationary contacts 21d and an armature member 21e carrying a cooperating movable contact member 21f which is biased to the open position by a spring 21g.

In order to eliminate any inaccuracies in the operation of the electroresponsive device 21 resulting from variations in the line voltage, one of the actuating coils is connected to the primary winding of the motor 10 and the other of the actuating coils is connected to the secondary winding. Obviously, this connection of the actuating coil to the secondary winding of the motor also includes connection to a special small secondary winding on motors such as squirrel-cage motors which do not have secondary working windings. The actuating coils 21b and 21c are so connected that their magnetomotive forces oppose each other. Since any variation in the line voltage is reflected in the secondary voltage of the motor, any inaccuracy of the relay as a result of variation in the line voltage is balanced out by the connections described. As shown, the actuating coil 21b is connected through normally open interlocks 14a on the reverse contactor 14 to one phase of the secondary terminals of the motor 10. Similarly the actuating coil 21c of relay 21 is connected by means of conductors 24, 25 and 26 and the normally open contacts 21h of relay 21 to the primary winding terminals of the motor or to the source as shown.

In order to eliminate the effects of varying frequency of the variable frequency voltage supplied to the actuating coil 21c, suitable full wave rectifying means 27 are included in the connections between the actuating coil and the secondary winding of the motor 10, and a similar rectifying means 28 is included in the connections between the actuating coil 21c and the source. Although any suitable rectifying means may be employed, the rectifying devices 27 and 28 are illustrated as copper oxide type rectifiers connected in bridge circuit connections to provide full wave rectification. Suitable resistors 29 and 30 are included in the coil connections, and a suitable adjustable resistor 31 is included in the connections 26 for the purpose of initially adjusting the balance of the coils 21b and 21c.

A lockout relay 32 is provided to prevent restarting the motor 10 until the master switch 13 has been operated to the off position after a plugging operation.

With the foregoing understanding of the elements and apparatus and their organization in the system, the operation of the system itself will readily be understood from the following detailed description.

To start the motor 10, the master switch 13 is actuated to its closed position in which a circuit is established for the actuating coil of the forward contactor 12. This circuit is traced from the lower supply line 11, through conductor 33, contacts of master switch 13, conductors 34 and 35, lower contacts of lockout relay 32 and control relay 15, conductor 36, actuating coil of contactor 12 to the upper side of the supply source 11. In response to energization, contactor 12 closes its contacts to connect the primary winding of motor 10 to the supply source 11 for rotation in the forward direction. Simultaneously, an energizing circuit is established for the actuating coils of plugging contactor 18. This circuit is the same as previously traced for contactor 12 as far as the conductor 36 and thence through conductors 37 and 38, actuating coil of plugging contactor 18 and conductor 39 to the upper side of the supply source 11. Plugging contactor 18 closes its contacts in response to energization and short-circuits the plugging section 17 of the secondary resistor. At the same time the actuating coil of a time delay relay 40 which is connected in parallel with the actuating coil of contactor 18 is energized, and after an interval of time determined by the setting of the time delay device 40a, the time delay relay 40 closes its contacts to establish an energizing circuit for the actuating coil of the accelerating contactor 20. This circuit is readily traced from the lower supply line 11 to the conductor 37 as before and thence through the contacts of time delay relay 40 and actuating coil of accelerating contactor 20 to the upper side of the supply source 11. In response to energization, accelerating contactor 20 closes its contacts to short-circuit the accelerating resistor 19, as a result of which the speed of the motor is increased to full operating speed.

If it is desired to stop the motor and to bring it rapidly to rest, the push button 16 is depressed to complete an energizing circuit for the actuating coil of the control relay 15. In response to energization, control relay 15 closes its upper and intermediate normally open contacts and opens its lower normally closed contacts thereby to interrupt the circuit for the actuating coil of forward contactor 12, and also to interrupt the energizing circuit for contactors 18 and 20, and the time delay relay 40 previously traced through these contacts. As a result forward contactor 12 opens its contacts and disconnects the motor 10 from the supply source 11. Simultaneously contactor 18 opens its contacts and inserts the plugging resistor 17 in the secondary circuit of motor 10, and accelerating contactor 20 opens its contacts and inserts the accelerating resistor 19 in the secondary circuit of motor 10.

In the closed position of the control relay 15, a circuit is established for the actuating coil of the reverse contactor 14 which is traced from the lower side of the supply source 11 through the contacts of the master switch 13, conductors 34, 35, and 41, intermediate contacts of control relay 15, conductor 42, normally closed interlocks on the forward contactor 12, actuating coil of reverse contactor 14 to the upper side of the supply source 11. In response to energization, contactor 14 closes its main contacts to connect the motor 10 to the supply source 11 for rotation in the reverse direction while its armature is still rotating in the forward direction. As a result of the establishment of these reverse power braking connections, a large braking torque is produced which tends to bring the motor 10 rapidly to rest. The magnitude of the current inrush to the motor and the magnitude of this braking torque are limited to safe values by means of the plugging resistor 17 and the accelerating resistor 19, both of which are now included in the secondary circuit of the motor.

In the closed position of the reverse contactor 14, the interlock 14a is also closed to connect the actuating coil 21b of relay 21 to one phase of the secondary winding of the motor 10.

At the instant the motor is plugged, the secondary voltage and frequency of motor 10 become double the locked rotor values and since the frequency effect of the voltage supplied to coil 21b is eliminated by means of the rectifier 27, the magnetomotive force of coil 21b is also doubled. As a result a flux is set up through the core and armature member 21e of the relay, which causes the armature member to move the movable contact member 21f to bridge the stationary contact 21d and the movable contact member 21j to bridge the stationary contact members 21h of the relay against the tension of the spring 21g. When the stationary contacts 21d are bridged by the movable contact member 21f, a circuit is completed in parallel with the contents of the push button switch 16 which may now be released. The closing of contacts 21h completes the connection of coil 21c to the primary winding of motor 10.

As the speed of the motor 10 is reduced, the magnitude of the secondary voltage and the magnitude of the magnetomotive force of the coil 21b are correspondingly reduced. At substantially zero speed of motor 10 the magnetomotive force of coil 21b becomes equal to and balanced by the magnetomotive force of coil 21c thereby reducing the flux in the core and armature of the relay to zero and allowing the spring 21g to open the contacts 21d and 21h. Since the push button switch 16 has been released, relay 21 in its open position interrupts the energizing circuit for the control relay 15. As the result of deenergization, control relay 15 closes its lower contact and opens its upper and intermediate contacts to interrupt the energizing circuit for the reverse contactor 14. As a result of its deenergization, contactor 14 opens its main contacts to interrupt the reverse power braking connections for the motor 10, and also opens its interlock contact 14a to interrupt the connections for the actuating coil 21b of relay 21. The circuit of coil 21c is interrupted at contacts 21h.

When control relay 15 was actuated to the closed position in response to closure of the push button switch 16, a circuit was established for the actuating coil of the lockout relay 32 which circuit is traced from the lower side of the supply source 11 through the contacts of the master switch 13, conductors 34, 35 and 41, upper contact of control relay 15 and actuating coil of lockout relay 32 to the upper side of supply source 11. In response to energization, the lockout relay closed its upper contacts to complete a locking circuit independent of the upper contacts of control relay 15 so that when the upper contacts of control relay 15 were subsequently opened in response to deenergization of the relay 21, the lockout relay 32 remained closed. In its closed position, lockout relay 32 maintains its lower contacts open and thereby prevents reenergization of the forward contactor 12 until the lockout relay 32 is deenergized by actuating the master switch 13 to its open position in which it is illustrated.

In the modification of Fig. 2, the single core type relay 21 is replaced by a balanced voltage type relay 43 illustrated as comprising a pivoted arm member 43a to which two core members 43b and 43c in turn are pivoted as illustrated. The coils 43d and 43e are similar respectively to the coils 21b and 21c of Fig. 1 and are similarly connected through rectifiers 44 and 45 to the secondary and primary terminals of the motor. The contacts 43f correspond to the contacts 21d and 21f of the relay 21 of Fig. 1. The coils 43d and 43e and resistors in the balanced voltage relay are so proportioned that at the instant of plugging, the contacts 43f will close, and not until the voltage generated across the slip rings of the motor has decreased to one-half of the locked rotor voltage, will the contacts of the relay open.

The operation of the modification of Fig. 2 is identical with the operation of the system of Fig. 1 described in the foregoing.

Although in accordance with the provisions of the patent statutes the principle of this invention has been explained and the structure described and explained which embodies the best mode in which it is contemplated applying the principle of the invention, it will be understood that the apparatus and elements and connections shown and desscribed are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:—

1. A control system for alternating current motors having primary and secondary windings comprising means for establishing reverse power connections to brake said motor, and means controlled in response to the voltage supplied to the primary winding and the voltage of said secondary winding for interrupting said reverse power connections at substantially zero speed of said motor.

2. A control system for an alternating current motor having a primary winding and a secondary winding comprising means for establishing reverse power braking connections to the primary winding of said motor, and means responsive to the voltage of said secondary winding and the voltage supplied to said primary winding for interrupting said reverse power connections comprising an electromagnetic switching device having electrical connections to both said windings.

3. A control system for an alternating current motor having a primary winding and a secondary winding, comprising means for establishing reverse power braking connections from a source of power to said primary winding, and means responsive to the voltage supplied to said primary winding and the voltage of said secondary winding for interrupting said connections at substantially zero speed of said motor comprising an electromagnetic switching device having electrical connections to both said windings and rectifying means included in said electrical connections.

4. A control system for alternating current motors having a primary winding and a secondary winding comprising means for connecting said motor to a supply source, means for establishing reverse power braking connections for said motor, and means responsive to the voltage of said secondary winding and the voltage supplied to said primary winding for interrupting said reverse power connections at substantially zero speed of said motor comprising an electromagnetic switching device having a core member and a pair of coils arranged in opposition thereon, electrical connections from one of said coils to the primary winding of said motor and from the other of said coils to said secondary winding and rectifying means included in said connections for eliminating the effect of the frequency of said voltages.

5. A control system for an alternating current motor having a primary winding and a secondary winding comprising a contactor for connecting the primary winding to a supply source for rotation in a forward direction, a second contactor for connecting said primary winding to said source for rotation in the reverse connection, means for actuating said first contactor to disconnect said primary winding from said source and for actuating said second contactor to connect said primary winding to said source to establish reverse power braking connections for said motor, and means for actuating said second contactor to interrupt said braking connections at substantially zero speed of said motor comprising an electromagnetic switching device having a core member and a pair of coils, each connected to one of said windings and arranged on said core so that their magnetic fluxes are in opposition.

6. A control system for alternating current motors having a primary winding and a secondary winding, reversing switching mechanism for said motor comprising forward and reverse electromagnetic contactors, means for actuating said forward contactor to connect said primary winding to a source, a switching device for deenergizing said forward contactor thereby to disconnect said primary winding from said source and for establishing an energizing circuit for said reverse contactor thereby to actuate said reverse contactor to establish reverse power braking connections for said motor, and means for deenergizing said reverse contactor to interrupt said reverse power braking connections at substantially zero speed of said motor comprising an electroresponsive device having a first coil connected to be responsive to the voltage supplied to the primary winding of said motor, an opposing coil connected to be responsive to the voltage of said secondary winding and contacts controlled by said coils for maintaining said energizing circuit for said reverse contactor upon establishment of said reverse power connections and for interrupting said energizing circuit when the magnetization of said opposing coil becomes equal to the magnetization of said first coil.

7. A control system for an alternating current motor having a primary winding and a secondary winding comprising in combination a forward contactor and a reverse contactor, means for actuating said forward contactor to connect said primary winding to a source, means for actuating said forward contactor to disconnect said winding from said source and for actuating said reverse contactor to establish reverse power braking connections for said motor, and means for interrupting said reverse power braking connections at substantially zero speed of said motor comprising a balanced type relay having a pivoted member provided with a pair of cores connected to said member on opposite sides of the pivot and a coil surrounding each of said cores, and electrical connections from one of said coils to said primary winding and from the other of said coils to said secondary winding.

8. A control system for an alternating current motor having a primary winding and a secondary winding, comprising in combination, reversing switching mechanism for said motor comprising forward and reverse electromagnetic contactors, means for actuating said forward contactor to connect said primary winding to a source, means for actuating said forward contactor to disconnect said primary from said source and for actuating said reverse contactor to connect said primary winding to said source to establish reverse power braking connections for said motor, and means for actuating said reverse contactor to interrupt said connections at substantially zero speed of said motor comprising an electromagnetic switching device for controlling the energization of said reverse contactor having electrical connections to said windings, interlock contacts controlled by said reversing switching mechanism for establishing said electrical connections only when said braking connections are established, and rectifying means in said electrical connections.

9. A control system for an alternating current motor having a primary winding and a secondary winding comprising forward and reverse contactors, means for actuating said forward contactor to connect said primary winding to a source for rotation in the forward direction, means for actuating said forward contactor to disconnect said motor from said source and for actuating said reverse contactor to establish reverse power braking connections from said primary winding to said source, and a balanced voltage type relay for effecting the actuation of said reverse contactor at substantially zero speed of said motor, said relay having a pivoted arm member, a pair of cores attached thereto on opposite sides of said pivot, a coil surounding each of said cores, contacts actuated by the movement of said pivoted member, and electrical connections from one of said coils to said primary winding and from the other of said coils to said secondary winding, said coils being so proportioned that their magnetomotive forces are substantially equal at zero speed of said motor whereby said contacts are actuated to deenergize said reverse contactor.

10. A control system for alternating current motors having a primary winding and a secondary winding comprising reversing switching mechanism for said motor, means for actuating said switching mechanism to connect said primary winding to a source for rotation in the forward direction, means for actuating said mechanism to disconnect said motor from said source and for establishing reverse power braking connections for said motor, and means for controlling said switching mechanism to interrupt said reverse power braking connections at substantially zero speed of said motor comprising an electroresponsive device having electrical connections to said secondary winding and rectifying means included in said connections for eliminating frequency effects from the voltage supplied to said electroresponsive device.

11. A control system for an alternating current motor having a primary winding and a secondary winding comprising a forward contactor and a reverse contactor, means for actuating said forward contactor to connect said primary winding to a source for rotation in the forward direction, a stop control switch for actuating said forward contactor to disconnect said primary winding from said source and for actuating said reverse contactor to establish reverse power braking connections for said motor, and means for actuating said reverse contactor to interrupt said connections comprising an electroresponsive relay having an actuating coil and a pair of normally open contacts in parallel with said stop control switch, auxiliary interlock contacts actuated by said reversing contactors for connecting said coil to said secondary winding so that said device closes said normally open contacts when said braking connections are established and opens said contacts at a predetermined motor speed, and rectifying means included in the connections between said coil and said secondary winding for eliminating frequency effects from the voltage supplied to said coil.

ALLAN J. WADE.